No. 821,246. PATENTED MAY 22, 1906.
M. KEGERREIS.
BEE FEEDER.
APPLICATION FILED DEC. 4, 1905.
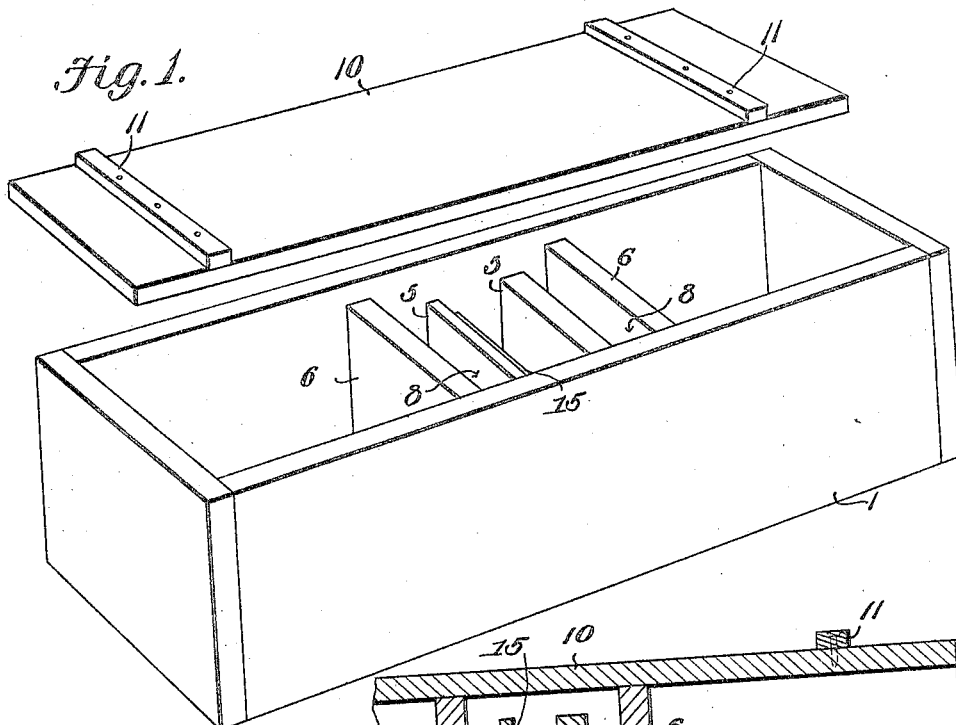
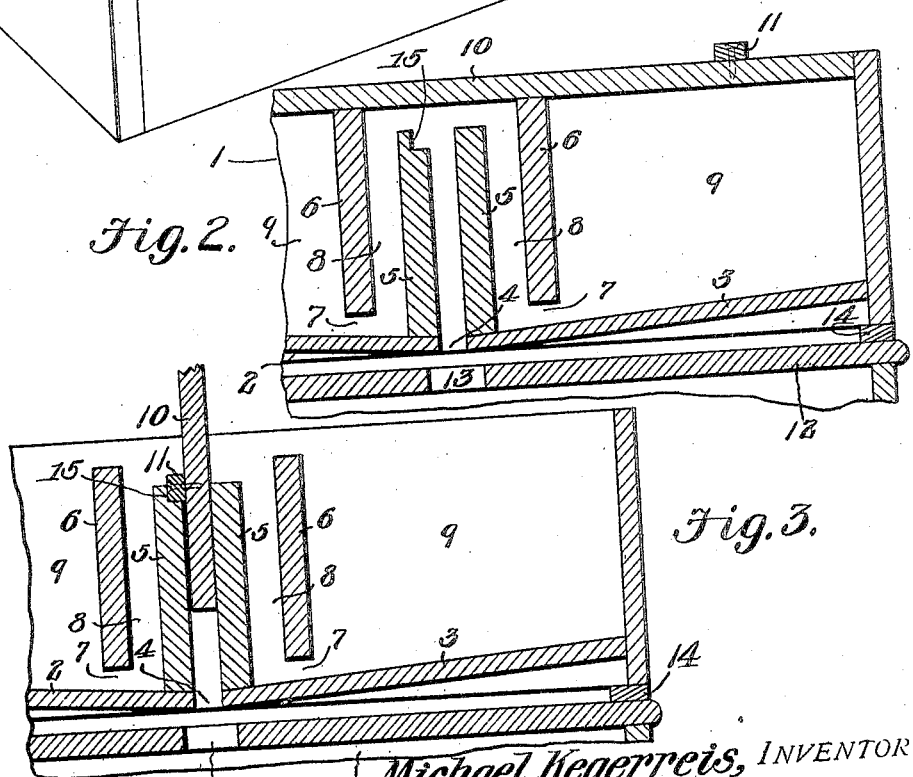
Michael Kegerreis, INVENTOR.

UNITED STATES PATENT OFFICE.

MICHAEL KEGERREIS, OF LEBANON, PENNSYLVANIA.

BEE-FEEDER.

No. 821,246.  Specification of Letters Patent.  Patented May 22, 1906.

Application filed December 4, 1905. Serial No. 290,272.

*To all whom it may concern:*

Be it known that I, MICHAEL KEGERREIS, a citizen of the United States, residing at Lebanon, in the county of Lebanon and State of Pennsylvania, have invented a new and useful Bee-Feeder, of which the following is a specification.

This invention relates to the art of bee culture, and has for its object to enable the convenient and satisfactory feeding and watering of bees which are wintered in a cellar or other inclosure.

Ordinarily bees which are wintered in a cellar or other inclosure leave the cellar to obtain water and in the majority of cases never return to the hives, as they become lost, frozen, or otherwise killed or seek other hives, whereby a considerable loss is entailed. I propose to overcome this difficulty by the provision of a feeder which may be conveniently supplied with sweetened water or the like and which is constructed for convenient access by the bees. Moreover, provision is made for conveniently closing the feeder against the bees in order that the attendant may examine the interior of the feeder for removing such bees as may have become drowned or otherwise lodged in the feeder.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of the present feeder with the lid elevated to disclose the interior of the device. Fig. 2 is a fragmentary longitudinal sectional view of the feeder supported upon the top of a hive in its operative position. Fig. 3 is a similar view showing the entrance-opening of the feeder closed.

Like characters of reference designate corresponding parts in all of the figures of the drawings.

The present feeder includes a body or receptacle 1, which is in the nature of an oblong wooden box of suitable proportions having its bottom divided into half-sections 2 and 3, which have their outer ends elevated and therefore incline downwardly and inwardly toward the middle of the box, where they are separated by an interspace 4 in the nature of a slot extending transversely across the bottom of the box. Rising from the inner end of each bottom section is a partition 5, which terminates short of the top of the box, the space between the two partitions constituting a passage leading from the bottom to the top of the box. At the inner side of each partition 5 there is another vertical transverse partition 6, which extends the full width of the box and rises to the top thereof, there being a space 7 between the bottom of the box and the bottom of the partition to form a communicating passage between the relatively small feed-chamber 8 between adjacent partitions 5 and 6 and the supply chamber or compartment 9. The open top of the box is normally closed by a cover 10, which fits within the top of the box and rests upon the tops of the partitions 6. Transverse cleats 11 are secured to the top of the cover adjacent its ends and serve as handles for convenience in lifting the cover from the receptacle.

In practice each compartment 9 is supplied with a suitable quantity of sweetened water, which runs through the passage 7 and rises into the compartment 8. The cover is of course closed and rests upon the tops of the partitions 6, so as to prevent access from the compartment 8 into the compartment 9 across the tops of the partitions 6. The feeder is then placed upon the top of a hive, a fragmentary top portion of a conventional form of which has been shown at 12 in Figs. 2 and 3 of the drawings, care being taken to center the entrance-opening 4 in the bottom of the feeder over the exit-opening 13 in the top of the hive. It is desired to have a slight space between the hive and the bottom of the feeder, and therefore a spacing-strip 14 is interposed between the top of the hive and each end of the bottom of the feeder. When the feeder is thus set up, bees are enabled to pass upwardly through the opening 4 and the space between the partitions 5, and thereby have access to the sweetened water in the compartments 8. After having procured the desired amount of food the bees can return to the hive and therefore are not liable to seek water out of doors.

When it is desired to inspect the interior of the feeder, particularly for removing drowned bees or such as may have become lodged in the feeding-compartment, the lid or cover 10 is removed and placed on end with one end and adjacent cleat 11 thrust into the entrance-passage between the partitions 5, as shown in Fig. 3 of the drawings, one of the partitions 5 being rabbeted or shouldered, as at 15, to form a seat for the reception of the cleat 11, while the top lies against one face of the other partition, whereby the entrance-passage is closed. When the entrance-passage has thus been closed, no more bees can have access to the feeder, wherefore it is perfectly safe to examine the feeder and remove drowned bees from the feeding-compartment.

From the foregoing description it will be understood that the device of the present invention is exceedingly simple and effective for the purpose designed and may be used without changing or preparing the hives.

Having thus described the invention, what is claimed is—

1. A bee-feeder comprising a receptacle having an entrance-opening in the bottom thereof, partitions rising from the bottom of the receptacle at opposite sides of the entrance-opening and terminating short of the top of the receptacle, other partitions extending from the top of the receptacle and terminating short of the bottom thereof, and a removable cover for the receptacle provided with a transverse cleat carried by one end portion of the cover and capable of being thrust with the cover into the open inner end of the passage leading from the entrance-opening.

2. A bee-feeder having an entrance-opening in the bottom thereof, partitions rising at opposite sides of the opening, one of the partitions having a shoulder upon its inner side adjacent its top, and a removable cover having a transverse cleat adjacent one end thereof, said cover capable of having one end thrust between the tops of the partitions with the cleat resting upon the shoulder of one of the partitions to close the space between said partitions.

In testimony that I claim the foregoing as my own I have hereto affixed my signature in the presence of two witnesses.

MICHAEL KEGERREIS.

Witnesses:
  ISAM MILLER,
  WM. CORL.